United States Patent [19]
Warner et al.

[11] Patent Number: 5,591,530
[45] Date of Patent: Jan. 7, 1997

[54] FLEXIBLE OPTICALLY UNIFORM SIGN FACE SUBSTRATE

[75] Inventors: Robert W. Warner, Woodbury; Robert C. Fitzer, North Oaks; David B. Redmond; Ronald J. Tabar, both of St. Paul, all of Minn.

[73] Assignee: Minnesota Mining and Manufacturing Company, St. Paul, Minn.

[21] Appl. No.: 422,266

[22] Filed: Apr. 14, 1995

Related U.S. Application Data

[62] Division of Ser. No. 955,344, Oct. 1, 1992, Pat. No. 5,422,189.

[51] Int. Cl.⁶ .................................................. B32B 27/36
[52] U.S. Cl. .................. 428/480; 428/412; 428/473.5; 428/474.4; 428/500; 428/187; 428/195; 428/481; 428/483
[58] Field of Search .................. 428/187, 195, 428/412, 423.7, 475.2, 480, 481, 483, 500; 264/176.1

[56] References Cited

U.S. PATENT DOCUMENTS

| | | | |
|---|---|---|---|
| 3,188,265 | 6/1965 | Charbonneau et al. | 161/188 |
| 3,565,985 | 2/1971 | Schrenk et al. | 264/171 |
| 4,257,937 | 3/1981 | Cohen et al. | 525/439 |
| 4,544,586 | 10/1985 | Molari, Jr. | 428/29 |
| 4,664,966 | 5/1987 | Bailey et al. | 428/203 |
| 4,680,234 | 7/1987 | Kelch | 428/461 |
| 4,693,926 | 9/1987 | Kowalski et al. | 428/204 |
| 4,724,186 | 2/1988 | Kelch | 428/344 |
| 4,774,146 | 9/1988 | Dehennau et al. | 428/518 |
| 4,804,566 | 2/1989 | Paul et al. | 428/35 |
| 4,824,723 | 4/1989 | Campbell et al. | 428/332 |
| 4,939,008 | 7/1990 | Kemski | 428/34.3 |
| 5,422,189 | 6/1995 | Warner et al. | 428/480 |

FOREIGN PATENT DOCUMENTS

| | | |
|---|---|---|
| 0301827A2 | 1/1989 | European Pat. Off. |
| 0128242 | 5/1991 | Japan . |

*Primary Examiner*—Paul R. Michl
*Assistant Examiner*—Kathryne E. Shelborne
*Attorney, Agent, or Firm*—Gary L. Griswold; Walter N. Kirn; Carolyn V. Peters

[57] ABSTRACT

Flexible optically uniform sign face substrate comprising at least one layer of durable thermoplastic sheeting and an optically uniform dimensionally stable scrim film, and more particularly a sign face substrate comprising at least one layer of optically uniform dimensionally stable multilayer scrim film laminated between at least two layers of durable thermoplastic sheeting for use in areas such as awning, canopy, fascia or sign material construction.

7 Claims, 2 Drawing Sheets

FLEXIBLE OPTICALLY UNIFORM SIGN FACE SUBSTRATE

This is a division of application Ser. No. 07/955,344, now U.S. Pat. No. 5,422,189, filed Oct. 1, 1992.

TECHNICAL FIELD

This invention relates to an optically uniform sign face substrate, useful for backlit awnings, canopies, signs, channel-cut letters, and facia for outdoor and indoor application.

BACKGROUND OF THE INVENTION

Current flexible sign face substrates are made with plasticized-pigmented vinyl. Embedded into this vinyl or sandwiched between several layers of the vinyl is a woven polyester scrim that gives the vinyl construction dimensional stability, that is, the vinyl construction tends not creep at elevated temperatures when the construction is put under tension. The polyester woven scrim also provides the sign face substrate with high tear resistance and tensile strength. Unfortunately, the polyester woven scrim used in commercially available sign face substrate is optically visible. For many applications such visibility is considered a defect.

Polyester woven scrim construction may also introduce other defects during the weaving process and final construction of the woven scrim, such as extraneous threads introduced from winding and unwinding the woven scrim during manufacturing. Loose threads can become embedded in the woven scrim and end up offering additional defects, over the original woven scrim, when backlit. Further, woven scrim is susceptible to wicking, which can lead to growth of mold and mildew.

Other sign face constructions useful for backlit and channel cut applications are made from rigid acrylics. Advantageously, sign face constructions prepared from the rigid acrylics can be self supporting, that is, an acrylic sign face can be slid into a frame, and the sign will not sag or appear otherwise unsightly and the rigid acrylics are generally optically uniform. Disadvantageously, the rigid acrylic is subject to cracking, shattering, and crazing. Furthermore, the rigid acrylics are costly to prepare and replace, and depending on the particular application can require labor-intensive installation.

U.S. Pat. No. 4,544,586 describes a laminar PET substrate laminated to a front light reflective layer useful as road sign markers and the like.

U.S. Pat. No. 4,680,234 describes a flexible weather-resistant film layer of a blend of a vinyl chloride polymer and chlorinated polyethylene and a second layer comprising a normally solid thermoplastic adhesive. The weather-resistant, multilayer film is used for architectural applications.

U.S. Pat. No. 4,693,926 describes a flexible decorative laminate useful as wall coverings on bulkhead panels in commercial aircraft. The laminate is lightweight, flexible, fire resistant, and decorative employing aluminum foil sheets.

U.S. Pat. No. 4,724,186 describes a flexible, weather resistant multilayer laminate film useful for a weatherable surface coating by lamination to a substrate having a weatherable layer. The coated substrates may be used in facia and other architectural film. The weatherable film is particularly suitable for use as a coating to a metal substrate.

U.S. Pat. No. 4,774,146 describes a coextruded thermoplastic for use as flexible packages.

SUMMARY OF THE INVENTION

Briefly, in one aspect of the present invention, an optically uniform sign face substrate is provided comprising an optically uniform, dimensionally stable scrim film laminated to at least one layer of durable thermoplastic sheeting.

The scrim film preferably comprises a multilayered construction of an optically uniform thermoplastic. The multilayered scrim film typically comprises at least five layers situated one on the other in a parallel array. However, depending on the materials used to fabricate the scrim film, less than 5 layers could be used in the scrim film construction, for example, when the ductile polymeric material of the scrim is derived from the reaction product of sebacic acid and terephthalic acid only 3 layers may be used. The layers are individually selected from a stiff polyester or copolyester and a ductile polymeric material. Preferably, the stiff polyester or copolyester layers are oriented in at least one direction and, more preferably, are biaxially oriented. The scrim film provides dimensional stability, that is, the sign face substrate does not creep, and at the same time the sign face substrate demonstrates high tear resistance and tensile strength. The durable thermoplastic sheeting comprises one or more layers of plasticized or non-plasticized materials, such a polyvinyl chloride, polyethylene acrylic acid or polyurethane. Furthermore, the sign face substrate using the multilayer scrim film is advantageously heat shrinkable, thus allowing for a greater latitude in applications for the sign face substrate of the present invention.

DESCRIPTION OF THE PREFERRED EMBODIMENT(S)

The sign face substrate of the present invention provides a flexible, low cost, light weight, durable, and dimensionally stable material useful for awnings, canopies, facia, channel-cut letters, and sign faces. The addition of an optically uniform, dimensionally stable scrim film (also referred to as "scrim film") to at least one layer of a durable thermoplastic sheeting provides strength and dimensional stability without introducing optical defects.

The sign face substrate (also referred to as "substrate") comprises at least one layer of a durable thermoplastic sheeting and an optically uniform, dimensionally stable scrim film, wherein the durable thermoplastic sheeting is typically pigmented and the scrim film comprises at least one layer of a dimensionally stable, optically uniform thermoplastic sheet.

Figure 1:
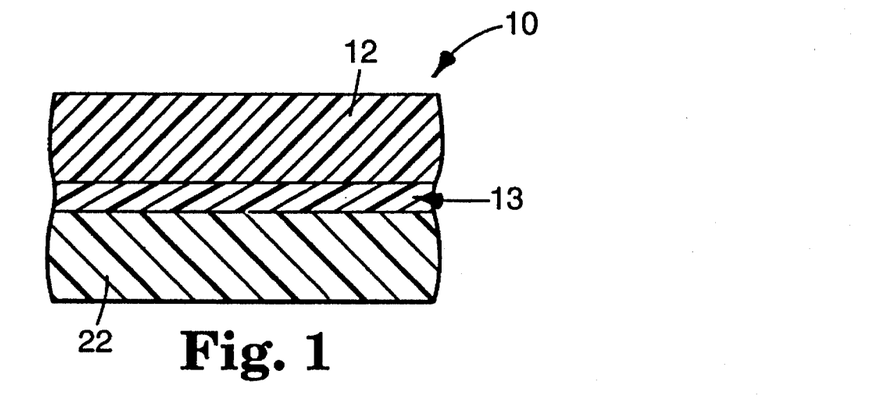
FIG. 1 is a cross-sectional view of a laminated construction of a sign face substrate useful as an awning.
Figure 2:
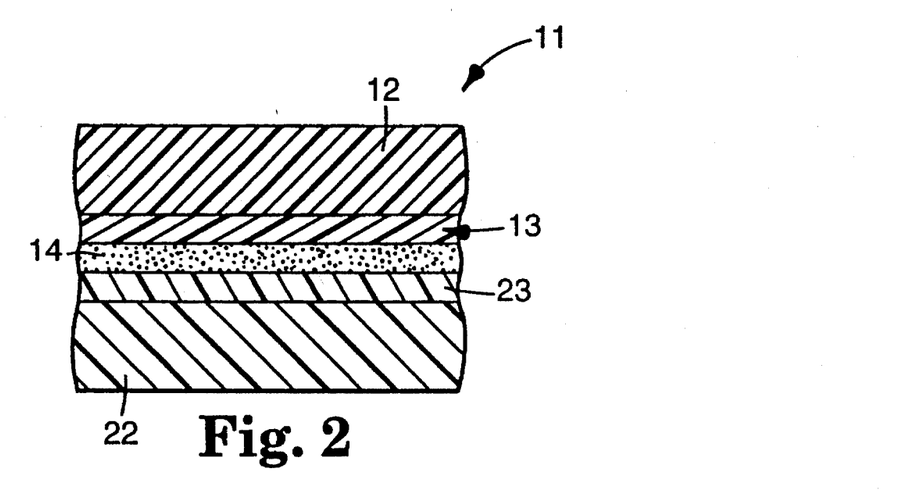
FIG. 2 is a cross-sectional view of an alternative embodiment of the present invention.

Contemplated to be within the scope of the present invention are various substrate configurations. While it is contemplated that a sign face construction may be fabricated with only a single layer of scrim film laminated to a single layer of durable thermoplastic sheeting, the preferred embodiment comprises at least a single layer of scrim film laminated between at least two layers of durable thermoplastic sheeting. Amongst various configurations contemplated are the following non-limiting examples, two of which are illustrated in FIGS. 1 and 2:

(1) in sequential order, (a) a first durable thermoplastic sheeting, (b) a multilayer scrim film, and (c) a second durable thermoplastic sheeting;

(2) in sequential order, (a) a first durable thermoplastic sheeting, (b) a plurality of multilayer scrim films, and (c) a second durable thermoplastic sheeting;

(3) in sequential order, (a) a first durable thermoplastic sheeting, (b) a multilayer scrim film, (c) a second durable thermoplastic sheeting, (d) a multilayer scrim film, and (e) a third durable thermoplastic sheeting;

(4) in sequential order, (a) a first durable thermoplastic sheeting, (b) a plurality of multilayer scrim films, (c) a second durable thermoplastic sheeting, (d) a plurality of multilayer scrim films, and (e) a third durable thermoplastic sheeting; and (5) in sequential order, (a) a first durable thermoplastic sheeting, (b) a multilayer scrim film, (c) a monolayer of scrim film, and (d) a second durable thermoplastic sheeting.

In all instances, a plurality of multilayer scrim films means more than one layer of scrim film; the several durable thermoplastic sheetings may be chemically the same or different; and there may optionally include various functional layers between the various layers of scrim film and durable thermoplastic sheetings. Such functional layers may include tie layers, barrier layers, adhesive layers, and the like.

Referring to FIG. 1, a cross-sectional view of a sign face substrate typically used for an awning construction 10 is illustrated. Awning construction 10 comprises a first layer 12 and a second layer 22 of a durable thermoplastic sheeting with an optically uniform scrim film 13 sandwiched between the two layers (12 and 22). Although first layer 12 and second layer 22 may be different durable thermoplastic sheetings, generally, both layers are the same durable thermoplastic sheeting both chemically and physically. Depending on the durable thermoplastic sheeting selected, and the scrim film used, a tie layer (not shown) may be used between first layer 12 and scrim film 13 and between scrim film 13 and second layer 22. The tie layer is any art known primer, tie layer, or adhesive useful for providing a non-delaminating interfacial bond between the durable thermoplastic layers (12 and 22) and scrim film 13. Scrim film 13 may be a monolayer or a multilayer composite of an optically uniform thermoplastic or a blend of thermoplastics.

Referring to FIG. 2, a cross-sectional view of a sign face substrate suitable for certain commercial applications is illustrated. Sign face substrate 11 comprises a first layer 12 and a second layer 22 of a durable thermoplastic sheeting and a first optically uniform scrim film 13 and a second optically uniform scrim film 23, such that both scrim films (13 and 23) are positioned between first layer 12 and second layer 22 of the durable thermoplastic sheeting. An adhesive layer 14 can be used to laminate first scrim film 13 and second scrim film 23 together. Similar to awning construction 10 (FIG. 1), a tie layer (not shown) may be used between a durable thermoplastic sheeting and a scrim film.

"Scrim film" as used in this application means a dimensionally stable, flexible, and optically uniform thermoplastic film. Useful scrim films may be, for example, polycarbonate, polyester, or a polymeric blend. The scrim film is either a monolayer construction or preferably, a multilayer construction. "Dimensional stability" as used in this application means the material is creep resistant, does not readily stretch and is of high modulus. "Optically uniform" as used in this application means a polymeric film that can be clear, transparent or translucent and does not show a visible pattern. "Tear resistant" as used in the application means a scrim film and sign face substrate demonstrate a Graves area in one direction exceeds the Graves area in the same direction as compared to a single layer film is processed in the same manner as the scrim film and sign face substrate. When the sign face substrate of the present invention is used for backlit applications, transmissive optical density is generally in the range of 15–60%, preferably in the range of 20–50%. This scrim film is then laminated to a durable thermoplastic sheeting to produce a flexible sign face substrate.

A particularly advantageous scrim film is a film comprising alternating layers of stiff polyester or copolyester and ductile polymeric material. The interaction of the two thermoplastic films in a multilayer construction provides both dimensional stability and tear resistance, along with the varying degrees of flexibility.

Figure 3:
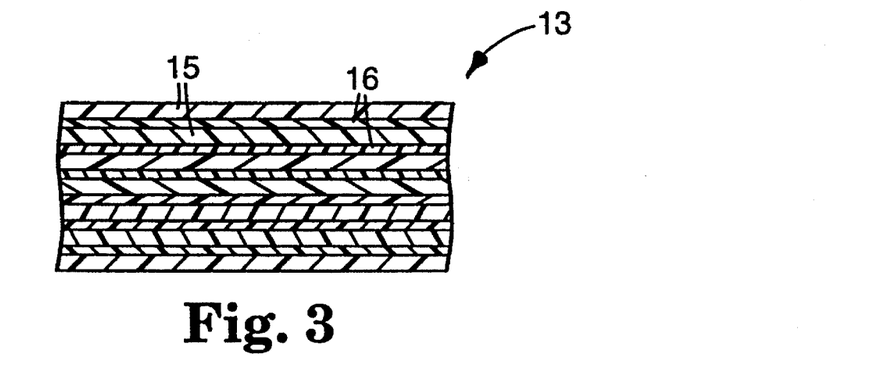
FIG. 3 is a cross-sectional view of a multilayer scrim film.

Referring to FIG. 3, a non-limiting example of scrim film 13 is illustrated. Scrim film 13 comprises alternating layers of stiff polyester or copolyester 15 and ductile polymeric material 16. Whether scrim film 23 (shown in FIG. 2) is fabricated from the same thermoplastic as that of scrim film 13, or different thermoplastic, the construction can also be represented by the drawing of FIG. 3, that is, the stiff and ductile layers are in an alternating configuration.

Moreover, preferred multilayer films desirably exhibit a Graves elongation at break (defined below) of at least 20%, more preferably at least 40% during the Graves area test. In addition, preferred multilayer scrim films demonstrate a tensile modulus (as measured in a conventional tensile test) of at least 175 kpsi (1,208 MPa), more preferably at least 240 kpsi (1,656 MPa), and most preferably at least 450 kpsi (3,105 MPa) in at least one direction of the film.

Both the thickness of the film and the individual layers which comprise the film may vary over wide limits. Useful scrim films typically have a nominal thickness of from about 7 to 500 μm, more preferably, from about 15 to 185 μm. The individual layers of stiff polyester or copolyester typically have an average nominal thickness of at least about 0.5 μm, more preferably from greater than 0.5 μm to 75 μm and, most preferably, from about 1 to 25 μm. It is preferred that the ductile material layers be thinner than the stiff material layers. The ductile material layers may range in average nominal thickness from greater than about 0.01 μm to less than about 5 μm, more preferably from about 0.2 to 3 μm.

Similarly, the exact order of the individual layers is not critical. The total number of layers may also vary substantially. While it is preferable that the scrim film comprises at least 5 layers, it is contemplated to use less than 5 layers depending on the materials used to fabricate the scrim film, for example, when the ductile polymeric material of the scrim is derived from the reaction product of sebacic acid and terephthalic acid only 3 layers may be used. More preferably, the scrim film comprises from greater than 5 layers to 35 layers, and most preferably 13 layers.

Stiff polyesters and copolyesters useful in the invention are typically high tensile modulus materials, preferably materials having a tensile modulus, at the temperature of interest, greater than 200 kpsi (1,380 MPa), and most preferably greater than 400 kpsi (2,760 MPa). Stiff materials useful in the practice of the invention comprise polyesters which are the reaction product of dicarboxylic acid (or ester derivatives thereof) and diol components. Preferably, the dicarboxylic acid component is either terephthalic acid or naphthalene dicarboxylic acid (such as dimethyl 2,6-naphthalene dicarboxylic acid) or ester derivatives thereof, and the diol component is either ethylene glycol or 1,4-butanediol. Preferred polyesters for use as the stiff material include polyethylene terephthalate, polyethylene naphthalate, polybutylene terephthalate, polybutylene naphthalate, and blends thereof.

Additional stiff copolyesters based on these materials may be made by copolymerizing the terephthalic and/or naphthalene dicarboxylic acid component(s) with one or more other diacids, including adipic, azelaic, sebacic, isophthalic, dibenzoic and cyclohexane dicarboxylic acids. Similarly, various stiff copolyesters may be formed by copolymerizing the ethylene glycol and/or 1,4-butanediol component(s) with one or more other diols such as diethylene glycol, propanediol, polyethyelene glycol, polytetramethylene glycol, neopentyl glycol, cylcohexane dimethanol, 4-hydroxy diphenol, bisphenol A, and 1,8-dihydroxy biphenyl. Useful stiff materials may also be provided by incorporating one or more other diacids and/or one or more other diols into the polymerization mixture. The amount of such other materials may be varied over wide limits so long as the resulting polymer is stiff.

As used herein, "stiff" means stretch resistant, creep resistant and dimensionally stable. More particularly, "stiff" materials according to the invention are high tensile modulus polyesters and copolyesters, preferably materials having a tensile modulus, at the temperature of interest, greater than 200 kpsi (kpsi=1000 pounds per square inch=6.9 MPa) (1,380 megaPascals (MPa)), more preferably greater than 300 kpsi (2,070 MPa), and most preferably greater than 400 kpsi (2,760 MPa). In some instances, orientation may be necessary to achieve the desired tensile modulus.

Tensile modulus of the stiff material is determined according to ASTI Test Method D 822-88 using a 4 inch (10.2 centimeters (cm)) gauge length and a separation rate of 2 inches/minute (5 cm/min). The "temperature of interest" means the average temperature at which the film (or a structure incorporating the film) is intended to be used. ASTI D 882-88 specifies a test temperature of $23°$ C.$\pm 2°$ C. If the temperature of interest for the multilayer film is within this range, the ASTI test procedure is followed as published. If, however, the temperature of interest is outside this range, then the test procedure is followed with the exception that the test is performed at the temperature of interest.

Ductile materials useful in the invention generally have a tensile modulus of less than 200 psi (1,380 MPa) and a tensile elongation, at the temperature of interest as defined above, of greater than 50%, preferably greater than 150%. Tensile modulus and tensile elongation of the ductile material are measured in accordance with ASTI Test Method D 882-88, a tensile test, using a 4 inch (10.2 cm) gauge length and a separation rate of 5 inches/minute (12.7 cm/min). "Tensile elongation" as used herein, refers to the elongation at break of the ductile material as measured during the referenced tensile test procedure.

Suitable ductile materials include ethylene copolymers such as ethylene/vinyl acetate, ethylene/acrylic acid, ethylene/methyl acrylate, ethylene/methacrylic acid, ethylene/methyl methacrylate, ethylene/ethyl acrylate, ethylene/ethyl methacrylate and blends and ionomers thereof. Ethylene/olefin copolymers in which the olefin component is provided by propylene, butylene or other higher order alpha-olefins may also be used. Preferably, the nonethylene portion of the copolymer comprises from 5% to 30% by weight of the copolymer. Particularly useful are ethylene/vinyl acetate copolymers having at least 6 mole % vinyl acetate. Examples of suitable commercial materials include the ELVAX series of ethylene/vinyl acetate copolymers (E. I. Du Pont de Nemours) and the ULTRATHENE series of ethylene/vinyl acetates (Quantum Chemical Corp.).

Suitable ductile materials also include a wide variety of polyesters and copolyesters which comprise the reaction product of dicarboxylic acid (including ester derivatives thereof) and diol components. Illustrative dicarboxylic acids include terephthalic acid, isophthalic acid, naphthalene dicarboxylic acid, adipic acid, azelaic acid, sebacic acid, and cyclohexane dicarboxylic acid. Diols with which these diacids may be polymerized include ethylene glycol, diethylene glycol, propanediol, butanediol, neopentyl glycol, polyethylene glycol, polytetramethylene glycol, poly ϵ-caprolactone, polyester glycol and cyclohexane dimethanol. The relative amounts of the diacid and diol components may be varied over wide limits.

A particularly preferred ductile copolyester comprises 60 mole equivalents of terephthalic acid and 40 mole equivalents of sebacic acid to provide the dicarboxylic acid component, and 100 mole equivalents of ethylene glycol for the diol component. Another preferred copolyester comprises 100 mole equivalents cyclohexane dicarboxylic acid for the dicarboxylic acid component, and 91 mole equivalents cyclohexane dimethanol and 9 mole equivalents polytetramethylene glycol for the diol component. Examples of commercially available copolyester resins which may be used to provide the ductile material include ECDEL-9965, ECDEL-9966 and ECDEL-9967 (Eastman Chemical Products, Inc.).

Suitable ductile materials further include polyolefins such as polyethylene, polypropylene and other higher order polyolefins.

Also useful as ductile materials are polyamides in which the dicarboxylic acid component and the diamine component (of which the polyamides are the reaction product) each individually have from 2 to 12 carbon atoms. The polyamides may be copolymerized with various long chain aliphatic glycols such as polytetramethylene glycol or polyethylene glycol. The glycol may comprise up to about 25% by weight of the polyamide. Useful polyamides include the PEBAX family of resins commercially available from Atochem.

Polyurethanes comprising the reaction product of various diioscyanates or triisocyanates and active hydrogen containing compounds may also be successfully employed as ductile materials. Useful diisocyanates and triisocyanates include hexamethylene diisocyanate, trans-cyclohexane 1,4-diisocyanate, isophorone diisocyanate, 2,2,4- and 2,4,4-trimethylhexamethylene diisocyanate, m-tetramethylxylene diisocyanate, p-tetramethylxylene diisocyanate, dicyclohexylmethane 4,4-diisocyanate, dimethyl diisocyanate, m-phenylene diisocyanate, p-phenylene diisocyanate, toluene 2,4-diisocyanate, toluene 2,6 diisocyanate, naphthalene 1,5-diisocyanate, diphenylmethane 2,4'-diisocyanate, diphenylmethane 4,4'-diisocyanate, polymethylene polyphenylene polyisocyanate, triphenylmethane 4,4',4"-triisocyanate, isocyanatoethyl methacrylate, 3-isopropenyl-$\alpha,\alpha$ dimethylbenzyl-isocyanate, and thiophosphoric acid, tris(4-isocyanatophenyl ester), as well blends or mixtures thereof.

Useful active hydrogen containing materials include diols (e.g., 1,4-butanediol, 1,6-hexanediol, castor oil), polyester polyols, polyether polyols, and polyfunctional primary or secondary amines. The equivalent ratio of diisocyanate to active hydrogen is about 1:1.

It has been found that relatively small amounts of the ductile material (i.e., amounts of less than 5 weight percent), relative to the stiff material, can greatly improve the tear resistance of multilayer films made therewith. However, as little as about 1 weight percent (weight % or wt. %), preferably at least about 2.6 weight %, of the ductile material is believed to be sufficient. Ductile material loadings up to about 10 to 20 weight % may be used although exceeding this range may reduce the tear resistance of films made therewith.

Preferably, the scrim films have an interlayer adhesion of at least 0.1 pounds/inch width (piw) (18 grams/cm (g/cm)), more preferably at least 0.5 piw (90 g/cm). Peel adhesion may be tested using ASTI Test Method F904-84 and a separation rate of 2 inches/minute (5 cm/min.). What constitutes an acceptable interlayer adhesion will be dictated in large part by the application intended for the multilayer film.

Because useful scrim films comprise a number of interleaved layers of different materials, it is sometimes necessary to provide a means for increasing the interfacial adhesion between adjacent layers to achieve the desired interlayer adhesion. Several techniques may be used. For example, when the interfacial adhesion between adjacent layers of stiff and ductile components is considered inadequate, a low concentration (e.g. about 0.01 to 10%) of a component which contains an appropriate functional group may be incorporated into either or both of the ductile and stiff materials to promote interlayer adhesion. This may be accomplished by, for example, reacting or blending the functional group-containing component with the ductile or stiff material or by copolymerizing or blending it with the monomers used to provide the ductile or stiff material. Examples of useful adhesion-promoting, functional group-containing components include acrylic acid, methacrylic acid, maleic anhydride, vinyl pyridine, oxazoline-containing materials (such as polyethyl oxazoline), and the like.

Alternatively, a layer of an appropriate intermediate material may be utilized as a tie layer between the layers of stiff and ductile materials. The intermediate layer may comprise a ductile material, a stiff material, or a rubbery material. The intermediate layer could also comprise a blend of stiff and ductile materials. Ductile and stiff materials are described above. Rubbery materials manifest no significant yield point, but typically display a sigmoidal rise in elongation with applied load until rupture occurs at high strain. Whatever the precise nature of the intermediate material, if it is being used as a tie layer, it must enhance the adhesion between the stiff and ductile materials. Combinations of these approaches, or even other approaches may also be used.

Many materials are useful as the intermediate layer. They include ethylene/vinyl acetate copolymers, preferably containing at least about 10% by weight vinyl acetate and a melt index of about 10, e.g., the ELVAX series of materials (Du Pont); carboxylated ethylene/vinyl acetate copolymers, e.g., CXA 3101 (Du Pont); copolymers of ethylene and methyl acrylate, e.g., POLY-ETH 2205 EMA (available from Gulf Oil and Chemicals Co.), and ethylene methacrylic acid ionomers e.g., SURYLN (Du Pont); ethylene/acrylic acid copolymers; and maleic anhydride modified polyolefins and copolymers of polyolefins, e.g., MODIC resins (available from Mitsubishi Chemical Company).

Other materials useful as the intermediate layer include polyolefins containing homogeneously dispersed vinyl polymers such as the VMX resins available from Mitsubishi (e.g., FN70, an ethylene/vinyl acetate-based product having a total vinyl acetate content of 50% and JN-70, an ethylene/vinyl acetate-based product containing 23% vinyl acetate and 23% dispersed poly(methyl methacrylate)), POLY-BOND (believed to be a polyolefin grafted with acrylic acid) available from Reichold Chemicals Inc., and PLEXAR (believed to be a polyolefin grafted with polar functional groups) available from Chemplex Company. Also useful are copolymers of ethylene and methacrylic acid such as the PRIMACOR family available from Dow Chemical Co. and NUCREL available from Du Pont. Other ethylene copolymers such as ethylene/methyl methacrylate, ethylene/ethyl acrylate, ethylene/ethyl methacrylate and ethylene/n-butyl acrylate may be used.

The various polyesters and copolyesters described above as being suitable ductile materials may also function as an intermediate layer.

The intermediate layer preferably comprises front about 1 to 30 (most preferably from about 2 to 10) weight % of the film. The nominal thickness of the intermediate layer can vary over a wide range depending on the number of layers in the multilayer film and the overall thickness of the film, but preferably is from about 0.01 μm to less than about 5 μm, more preferably from about 0.2 to 3 μm.

Alternatively, adjacent layers of stiff and ductile materials may be treated with radiation, such as ultraviolet, electron beam, infrared or microwave radiation, to improve adhesion.

Each of the stiff, ductile and intermediate layer materials may further include or be supplemented with various adjuvants, additives, extenders, antioxidants, thermal stabilizers, ultraviolet light stabilizers, plasticizers, slip agents, etc. that are conventionally and customarily used in the manufacture of such materials or films made therewith. These supplemental materials may comprise up to about 5 weight % of the total weight of the layers into which they are incorporated so long as the tear resistance of the film is not significantly adversely affected.

Useful scrim films may be readily made using techniques known in the art. One such technique is disclosed in U.S. Pat. No. 3,565,985. In making scrim films, melt coextrusion by either the multimanifold die or the feedblock method in which individual layers meet under laminar flow conditions to provide an integral multilayer film may be used. More specifically, separate streams of the ductile, stiff and, optionally, intermediate materials in a flowable state are each split into a predetermined number of smaller or sub-streams. These smaller streams are then combined in a predetermined pattern of layers of stiff, ductile and, optionally, intermediate materials to form an array of layers of these materials in a flowable state. The layers are in intimate contact with adjacent layers in the array. This array generally comprises a tall stack of layers that is then compressed to reduce its height. In the multimanifold die approach, the film width remains constant during compression of the stack while the width is expanded in the feedblock approach. In either case, a comparatively thin, wide film results. Layer multipliers in which the resulting film is split into a plurality of individual subfilms that are then stacked one upon another to increase the number of layers in the ultimate film may also be used.

In manufacturing the scrim films, the materials may be fed such that any one of the three constitutes the outer layer. The two outer layers often comprise the same material. Preferably, the materials comprising the various layers are processable at the same temperature and have similar melt viscosities so as to avoid degrading a lower melting material. Accordingly, residence time and processing temperatures may have to be adjusted depending on the characteristics of the materials of each layer.

Other manufacturing techniques such as lamination, coating or extrusion coating may be used in assembling the multilayer scrim films. For example, in lamination, the various layers of the film are brought together under temperature and/or pressure (e.g., using heated laminating rollers or a heated press) to adhere adjacent layers to each other. In extrusion coating, a first layer is extruded onto either a cast web, a monoaxially oriented film or a biaxially oriented film and subsequent layers are sequentially coated onto the previously provided layers. Exemplary of this method is U.S. Pat. No. 3,741,253. Extrusion coating may be preferred over the melt coextrusion process described above where it is desirable to pretreat selected layers of the multilayer film or where the materials are not readily coextrudable.

It is preferred that the layers of the stiff material be oriented, either uniaxially or biaxially, at a temperature above their glass transition temperature so as to enhance the stiffness, modulus and creep resistance of the film. (For some uses, such as thermoforming applications, orientation of the stiff material layers would not be required.) Orientation of the ductile and intermediate layer materials is optional. Orientation may be accomplished by conventional methods typically used in the art such as mechanical stretching (drawing) or tubular expansion with heated air or gas. Typical draw ratios are in the range of 2.5 to 6 times in either or both of the machine and transverse directions. Greater draw ratios (for example, up to about 8 times) may be used if the film is oriented in only one direction. The film need not be stretched equally in the machine and transverse directions although this is preferred if balanced properties are desired.

The films may also be heat set by exposing the film to a temperature of about 10° to 150° C. below the melting temperature of the stiff component for about 4 to 15 seconds so as to increase the crystallinity, stiffness, modulus and creep resistance of the film while reducing its tendency to shrink. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film and perhaps its intended application but should not be selected so as to substantially degrade the tear resistant properties of the film. Within these constraints, a heat set temperature of about 135° to 205° C. is generally desirable for the scrim multilayer films.

Useful multilayer scrim films are both stiff (dimensionally stable, high modulus) and tear resistant. Stiff, high tensile modulus, creep resistant films such as cellophane, polyester and biaxially oriented polypropylene packaging films have little tear resistance. On the other hand, low tensile modulus, ductile materials such as polyolefin trash bags are tear resistant but are not dimensionally stable (i.e., they stretch readily). Useful scrim films provide the desirable properties of both high tensile modulus, stiff, dimensionally stable, creep resistant materials and low tensile modulus, ductile, tear resistant materials in a multilayer arrangement. As a result, multilayer scrim films offer both excellent tear resistance and dimensional stability. This beneficial amalgamation of properties is achieved because the different materials which comprise the scrim films are assembled in a multilayer arrangement. Single layer blends of stiff and ductile polymers do not equally reflect the characteristics of the scrim films.

Suitable durable thermoplastic sheetings useful for the sign face substrate are prepared from durable thermoplastics that include polyester, polyamides, polyimides, polyurethanes, polyureas, polypropylene, polyethylene, polycarbonates, polyethylene acrylic acid, polyvinyl chloride, polyethylene methacrylic acid, thermoplastic rubbers, (e.g. nitriles), polypropylene oxides, polystyrenes, polystyrene-polydiene block copolymers, ionic thermoplastic elastomers, polyethers, polyesteramides, polyetheresteramides, siloxanes, ethylene vinyl acetate, PMMA, PVDC, acetate copolymer, polycaprolactones, silicone rubbers, (Fluore Tedlar), fluorine-containing elastomers, polybutenes, and elastomeric block copolymers and blends of aforementioned. Examples of commercially available thermoplastics, which may be used include ELVAX ™, SURLYN™, HYTREL™, KEVLAR™, and KRATON™. Preferred durable thermoplastics are polyvinyl chloride, polyethylene, polyurethane, polyethylene acrylic acid, polypropylene, polyester, polycarbonate, polyimides, polyamides, and blends thereof.

Although polyvinyl chloride (PVC) is inexpensive, inherently flame retardant, and able to be graphically decorated by various methods, PVC generally must be plasticized. This plasticizer blooms, migrates, or outgasses to the surface causing a number of problems. For example, the migrating plasticizer can turn yellow because of thermal and UV exposure. The migrating plasticizer creates a surface for dirt, grease and grime to settle onto and adhere causing discoloration. Further, as the plasticizer migrates to the surface, thus leaving the PVC, the PVC becomes increasingly susceptible to cracking or shattering. Plasticized PVC has a high $T_g$, that is, PVC shatters at low temperatures, that is, typically temperatures used in zero or subzero applications. Furthermore, the migrating plasticizer tends to cause adhesion problems of the decal graphic or topcoat on the surface of the PVC.

The more preferred durable thermoplastic sheeting is one prepared from polyethylene acrylic acid (PEAA). The PEAA sheeting is not plasticized and can be loaded with inorganic pigments, organic antioxidants and UV stabilizers. Further, PEAA can be extruded as a free film or be extrusion laminated for a sign material substrate. Although the PEAA sheeting does not contain plasticizer, the PEAA sheeting is still soft and feels similar to PVC sheeting. The PEAA has excellent outdoor durability when filled with pigments, antioxidants and UV stabilizers. Advantageously, since there is no plasticizer to migrate from the PEAA, a sign face substrate construction offers superior durability, that is, the substrate is dirt resistant, cleanable, and tends not to turn yellow. Further, since PEAA has a $T_g$ lower than PVC, the application temperature is enhanced, that is, the sign face substrates comprising PEAA are durable below 0° C.

The scrim film and the durable thermoplastic sheeting may be laminated together by using a tie layer between the scrim film and the durable thermoplastic sheeting. Useful tie layers include the intermediate layers for the scrim film described above.

Alternatively, the scrim film and the durable thermoplastic sheeting may be laminated together by extruding the durable thermoplastic onto the scrim film. The surface of the scrim film, that is, the surface to be laminated to the durable thermoplastic sheeting, can optionally be prime coated. The prime coat can be any art known prime coat used to promote a non-delaminating interfacial bond between the scrim film and the durable thermoplastic and is selected depending on the chemical composition of both the scrim film and the durable thermoplastic. The bond between the durable thermoplastic sheeting and the scrim film can then be irradiated through the scrim film for a predetermined period of time. Another procedure to provide an excellent laminate is to lay the scrim film and the durable thermoplastic sheeting together on a preheated hot plate. By passing a roller under moderate hand pressure over the films several times for a short period of time, the films can flow sufficiently to form an interface with each other. This interface can then be irradiated through the scrim film with UV radiation. The duration of irradiation is dependent upon the thickness of the scrim film selected, as well as the composition of the scrim film. This process is further described in U.S. Pat. No. 3,188,265, Example 1 and such description is incorporated herein by reference.

If desired, a functional layer may be applied to one or both of the major surfaces of the scrim film and/or durable thermoplastic sheeting. For example, an adhesive may be applied to at least one of the major surfaces of the scrim film and/or durable thermoplastic sheeting. The adhesive may be activatable by pressure, heat, solvent or any combination thereof and may be of any type such as an acrylate, a rubber/resin, or a silicone. Other functional layers, for example, a UV absorbing layer, a radiation (e.g., light) sensitive or blocking layer, an ink-receptive layer, a top coat, a plasticizer migration barrier layer, a primer layer, a reflective layer, or a moisture or gas barrier layer may be employed. Other functional layers may also be used. The functional layers may be employed singly or in combination with other functional layers on one or both sides of the scrim film and/or durable thermoplastic sheeting. Various functional layers may be subsequently applied by lamination, extrusion coating or other known techniques. Various primers and/or surface treatments may be required as discussed more fully above. The optically uniform sign face substrate of the present invention typically have a nominal thickness of from 5 to 30 mils, preferably from about 10 to 25 mils.

To modify the surface properties of the scrim film and/or durable thermoplastic sheeting or to promote adhesion of any subsequently applied functional layer, the scrim film and/or durable thermoplastic sheeting may be pretreated with a primer coating, activated by flame or corona discharge or other surface treatments, or a combination of these approaches.

For example, PEAA sheeting, the more preferred durable thermoplastic sheeting may be primed to accept ink, a topcoat, or an adhesive coated graphic film. The primer of choice is "NeoRez" (commercially available from Rohm & Haas). Ink adhesion testing on "NeoRez"-primed PEAA sheeting using a red Naz-Dar ink screen printed onto both the matte and gloss sides of the durable thermoplastic sheeting showed no ink adhesion failure with the standard tape snap test using 610 Tape and razor scribing. Some durable thermoplastic sheeting show improved ink adhesion after the sheeting has been primed.

The sign face substrate can be clear-coated as a means to prevent dirt accumulation. The film was readily clear coated by screen printing a two-component urethane onto both the gloss and matte finish sides. Dirt accumulation studies demonstrate that the clear coat does afford a superior barrier for dirt accumulation over the non-coated film. The clear coat itself does not come off the film. A snap test using 610 Tape and razor scribing showed no clear coat adhesion failure. Naz-Dar inks may also be screen printed directly onto the clear coat and shown no adhesion failure using 610 Tape and razor scribing snap test.

In the construction of this invention if a clear or frosted substrate is laminated to the scrim film the finished material would be useful as a window film and a substitute for certain areas where window glass is used or such as window material in tents and campers or even as a protective shield over expensive windows during inclement weather conditions.

Objects and advantages of this invention are further illustrated by the following examples, but the particular materials and amounts thereof recited in these examples, as well as other conditions and details, should not be construed to unduly limit this invention. All starting materials were commercially available or prepared as indicated unless otherwise stated or apparent.

EXAMPLES

Tear Resistance

The tear resistance of the scrim films and sign face substrates may be measured by ASTM Test Method D 1004 (also known as a Graves tear test). In a Graves tear test, a film sample described in ASTM D 1004 is clamped between opposed jaws with an initial separation of 1 inch (2.5 cm). The jaws are then moved apart at a constant rate of 2 inches/minute (5 cm/min.) to tear the film. The film may be torn in either the machine direction (i.e., the direction in which the film is extruded) or the transverse direction (i.e., perpendicular to the machine or extrusion direction).

Figure 4:
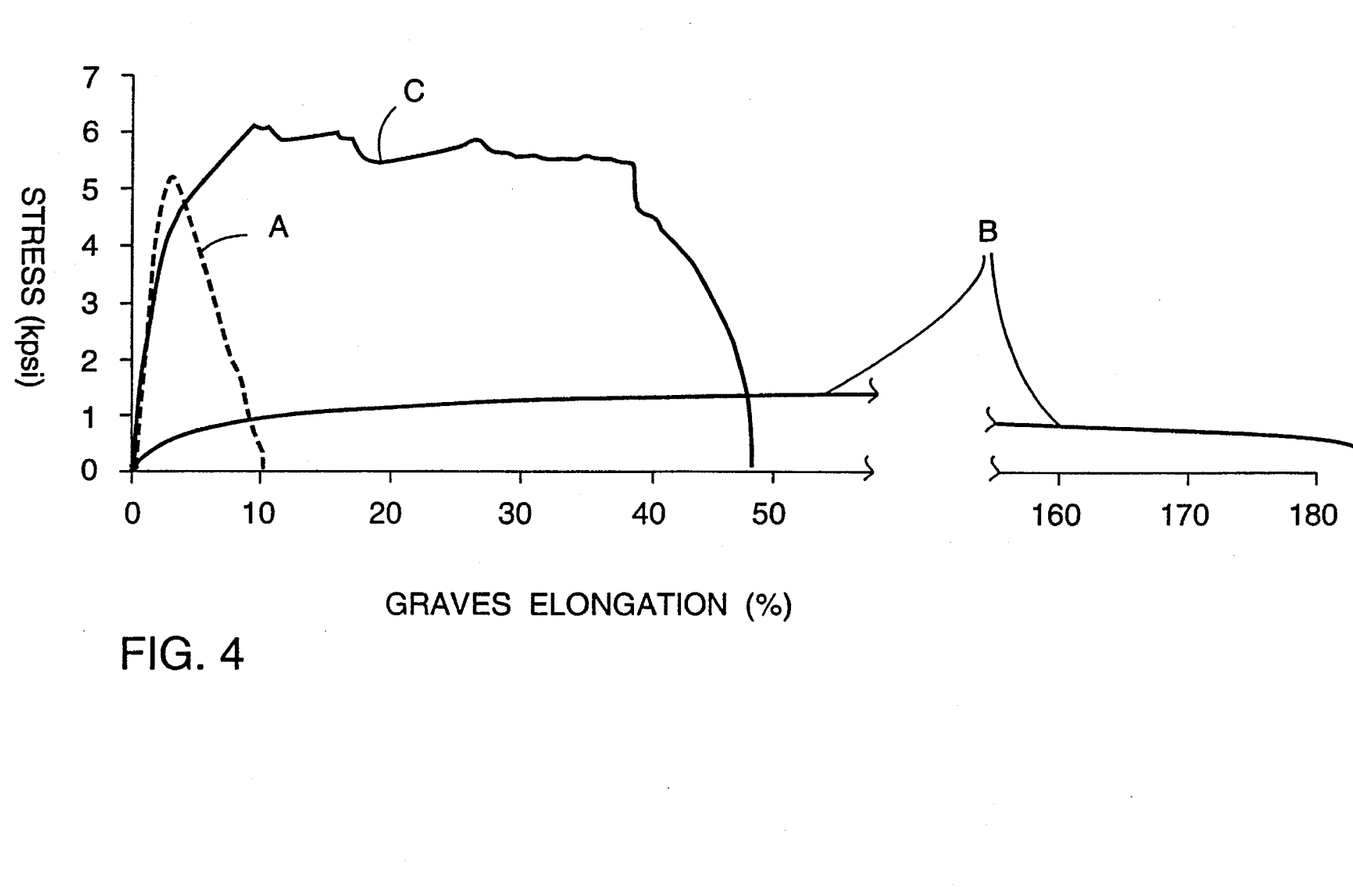
FIG. 4 is a graphical representation of stress vs. % elongation in a Graves area test for three different films.

With reference to FIG. 4, test data can be recorded by graphically plotting the stress (as measured in kpsi) experienced by the film versus the strain (as measured by Graves elongation at break in %) that the film undergoes during the test. "Stress" is defined as the recorded force divided by the product of the film thickness and the ligament width. The expression "Graves elongation" as used herein refers to the elongation of a film in the tear direction as observed during a Graves area test and reflects the percent change in the jaw separation distance that occurs during the test relative to the jaw separation distance at the outset of the test. "Graves elongation at break" as used herein refers to the elongation of the film in % at its break point observed during a Graves area test. (It will be understood that Graves elongation at break differs from tensile elongation. Tensile elongation is measured during a tensile test and may be used to characterize ductile materials useful in the invention as explained above.)

With continued reference to FIG. 4, the plot (i.e., "curve") labeled with the letter "A" describes a film having a large maximum stress which falls off quickly as the film is stretched during the test. Curve A typifies the performance of a high modulus, stiff, dimensionally stable material that has poor tear resistance (as shown by the rapid falloff in stress as the film tears). Polyesters, cellophane, biaxially oriented polypropylene and similar packaging films perform similarly to curve A.

The curve labeled with the letter "B" describes the performance of a low modulus, ductile, readily stretchable, traditionally tear resistant material (as evidenced by the relatively high Graves elongation at break relative to curve A) because the film stretches rather than tears. The film is capable of sustaining only a relatively low stress. Plastic trash and grocery bags are common examples of films that would perform in a manner similar to that described by curve B.

Curve "C" illustrates the performance of a multilayer scrim film more specifically, the film of Example P2 described below. The maximum stress sustained by this film is similar to or exceeds the stiff film of curve A. However, the stress experienced by the curve C film of the invention does not fall off as rapidly as in the case of the curve A film. Thus, as compared to conventional polyester films of curve A, the preferred multilayer scrim films are more able to successfully withstand catastrophic tearing forces while being of substantially equal modulus. As compared to the low modulus films of curve B, useful scrim films are able to sustain much higher stress.

In a Graves tear test, tear resistance data are conventionally reported as the maximum force experienced by the film. The data reported herein, however, are the total area (referred to herein at times as the "Graves area") beneath the stress-strain curve (i.e., the curves of FIG. 4) that is obtained by a mathematical integration of the curve. Graves area is regarded as a measure of the total energy required to cause the film to fail and, hence, a measure of the film's combined stiffness and tear resistance. Thus, Graves area may be regarded as a measure of the ability of the film to absorb energy. Graves area is reported herein in units of kpsi % wherein 1 kpsi % =69 kilojoules/cubic meter. It will be understood that films with a relatively large Graves area have enhanced combined stiffness and tear resistance relative to those films with a relatively small Graves area.

Tear Resistance Results Related to This Invention

Tear resistance was measured on the 13 layer scrim film and standard PET film. Both were similar in thickness of approximately 2.0 mil. The following values are for Graves Initial, and Graves Area. Each test was run in the machine direction (MD) and transverse direction (TD) directions of the film.

|  |  | Scrim Film | PET Film |
| --- | --- | --- | --- |
| Graves Initial | MD | 8.7 | 5.6 |
| (Tear in lbs.) | TD | 6.9 | 5.9 |
| Graves Area | MD | 367.2 | 74.5 |
| (kpsi %) | TD | 245.7 | 71.6 |

The Graves Initial Values for both the scrim film and PET Film are initially similar, particularly, the TD Values. Standard PET (polyethylene terephthalate—differential scanning calorimetry (DSC) melting point of 256° C.; intrinsic viscosity of 0.60 dl/g as measured in 60% phenol and 40% dichlorobenzene at 110° C.) does have good initial tear resistance, that is, a high modulus causing a high initial force to tear. The difference between the multilayer scrim film and the standard PET film is the Graves area. Standard PET shatters after initial tear, that is, the tear propagates, whereas the scrim film resists tear and inhibits propagation of the tear.

Example P1

PEAA Film Construction

A pigmented-stabilized ethylene-acrylic acid (EAA) copolymer is prepared as follows:

The ethylene-acrylic acid copolymer used was an extrusion-grade, thermoplastic high molecular weight copolymer of ethylene and acrylic acid (commercially available from Dow Chemical under the trade name "Primacor™ 3440") having a melt index of 10.0 grams/10 minutes. The following pigments and weathering stabilizer (described in U.S. Pat. No. 4,664,966, Example 1) were compounded with the PEAA resin:

| | |
| --- | --- |
| 15% (by weight) | BaSO4 |
| 0.2% (by weight) | TiO2 |
| 0.5% (by weight) | blue ink |
| 3.6% (by weight) | a weathering stabilizer system consisting of: |
| 2% (by weight) | TINUVIN 328 UV absorber |
| 1.5% (by weight) | CHEMOSORB 944 - hindered amine light stabilizer |
| 0.05% (by weight) | IRGANOX 1010 - antioxidant |

This resin mixture was shaken homogeneous and extruded to a 12" finished width film at 6.5 mil (0.16 mm) thickness. Two laminated layers of the 6.5 mil extruded PEAA film gave 26.3% light transmission.

Example P2

PET:coPET (Sebacic Acid) Scrim Film

The scrim film was a 13 layer PET/coPET (alternating layers) construction. The scrim film was formed by coextruding poly(ethylene) terephthalate (PET) (differential scanning calofimetry (DSC) melting point of 256° C.; intrinsic viscosity of 0.60 dl/g as measured in 60% phenol and 40% dichlorobenzene at 110° C.) as the stiff material with a sebacic acid based copolyester as the ductile material. The sebacic acid based copolyester comprised 40 mole % sebacic acid and 60 mole % terephthalic acid as the dicarboxylic acid components and 100 mole % ethylene glycol as the diol component. The PET-coPET ratio was 90:10. The sebacic acid based copolyester has an intrinsic viscosity in the range of 0.9 to 1.05 dl/g when measured in the same manner as the PET. The ductile copolyester had a tensile modulus of 14 kpsi (97 kPa) and a tensile elongation to break of 355% when tested according to ASTM D822-88 at room temperature but using a separation rate of 5 in/rain (12.7 cm/min).

The multilayer film was coextruded onto a chilled casting wheel and subsequently oriented sequentially 2.6 times in the machine direction (MD) at 86° C. and 4.5 times in the transverse direction (TD) at 103° C. The film was then heat set at 149° C. The scrim film was 2 mil (50.8 μm) thick. This material gave a TD Graves area of 72 kpsi % and a MD Graves area of 61 kpsi % with a MD Graves elongation at break of 25% and a TD Graves elongation at break of 23%.

Example P3

PET:coPET (Sebacic Acid) Scrim Film

The scrim film was a 13 layer PET/coPET (alternating layers) construction. The scrim film was formed by coextruding poly(ethylene) terephthalate (PET) (differential scanning calorimetry (DSC) melting point of 256° C.; intrinsic viscosity of 0.60 dl/g as measured in 60% phenol and 40% dichlorobenzene at 110° C.) as the stiff material with a sebacic acid based copolyester as the ductile material. The sebacic acid based copolyester comprised 40 mole % sebacic acid, and 60 mole % terephthalic acid.

The multilayer film was coextruded onto a chilled casting wheel and simultaneously oriented about 3.3 times in the machine direction (MD) at 97° C. and about 3.5 times in the transverse direction (TD). The film was then heat set at 149° C. The scrim film was 2 mil (50.8 μm) thick. This material gave a TD Graves area of 102 kpsi % and a MD Graves area of 115 kpsi % with a MD Graves elongation at break of 30.5% and a TD Graves elongation at break of 29.5%.

Examples P4–P8

PET:coPET (ECDEL™) Scrim Film A series of films comprising a total of 13 alternating layers of the stiff material of Example P2 and a ductile material prepared from ECDEL 9966 (believed to be a copolyester based on 1,4-cyclohexane dicarboxylic acid, 1,4-cyclohexane dimethanol, and polytetramethylene ether glycol) was coextruded onto a chilled quenching wheel. When tested according to the procedures described in Example P2 for the ductile copolyester, the ductile material was found to have a tensile modulus of 26 psi (179 MPa) and an elongation at break of 630%. The films were simultaneously oriented 3.3 times in both the machine and transverse directions at 99° C. and heat set at 135° C. The film thickness and the relative amounts of the ductile material were varied as shown below in Table 3. The Graves area and tensile modulus were tested in the machine and transverse directions as described above with the results shown below.

| Ex. | Film Thickness (μm) | Wt. % Ductile Material | Graves Graves Area (kpsi %) MD | TD | Elongation at Break (%) MD | TD | Tensile Modulus (kpsi) MD | TD |
|---|---|---|---|---|---|---|---|---|
| P4 | 46.0 | 2.6 | 340 | 230 | 35 | 30 | 560 | 610 |
| P5 | 47.5 | 4.1 | 440 | 180 | 80 | 50 | 555 | 595 |
| P6 | 49.8 | 6.9 | 320 | 240 | 65 | 65 | 550 | 570 |
| P7 | 50.8 | 9.7 | 330 | 280 | 70 | 65 | 525 | 545 |
| P8 | 52.8 | 12.2 | 270 | 300 | 65 | 70 | 590 | 545 |

The summarized data in table showed the benefit of the multilayer films useful in the present invention including at least about 2.6 wt. % of the ductile material. Acceptable Graves area and tensile modulus values were observed as the wt. % varied from 2.6 to 12.2. Even when the amount of the ductile material was less than 5 wt. %, useful Graves area and tensile modulus values were obtained.

Example P9

PET/EVA Scrim Film

The scrim film was a 9 layer PET/EVA (alternating layers) construction. The scrim film was formed by coextruding poly(ethylene) terephthalate (PET) (commercially available from Goodyear under the trade designation of 8002C) with a poly(ethylene) co-vinyl acetate (EVA) (commercially available from Du Pont under the trade name "ELVAX 3190"). The PET:EVA ratio was 80:20.

The multilayer film was coextruded onto a chilled casting wheel and subsequently stretched 2.5:1 in the machine direction at a temperature of 88° C. and 2.5:1 in the transverse direction at a temperature of 104° C. The film was then heat set at a temperature of 177° C. The PET:EVA film had a thickness of approximately 2.5 mils (63.5 μm).

Example P10

PET/EVA Scrim Film

The scrim film was a 13 layer PET/EVA (alternating layers) construction. The scrim film was formed by coextruding polyethylene terephthalate (PET) (commercially available from Goodyear under the trade designation of 8002C) with a poly(ethylene) co-vinyl acetate (EVA) (commercially available from Du Pont under the trade name "ELVAX 450"). The PET:EVA ratio was 90:10.

The multilayer film was coextruded onto a chilled casting wheel and subsequently simultaneously stretched 3.2:1 in the machine direction and 3.2:1 in the transverse direction at a temperature of 104° C. The film was then heat set for 15 seconds at a temperature of 177° C.

Example 1

Sign Face Substrate Construction

The scrim film described in Example P2 was corona-treated using 0.3–0.4 joules/cm$^2$ of energy. This corona-treated scrim film was then coated with a water-based silica prime described in EPO 0 301 827 A3. The primer was prepared by adding 22 wt. % NALCO™ colloidal silica to 77 wt. % deionized water. To this solution was added 0.29 wt. % aminopropyltriethoxysilane (APS), followed by 0.30 wt. % of a surfactant (TRITON™X-100). This solution was coated onto the corona-treated scrim film using a 170 line Ohio Gravure coater. The primer was dried between 65.6° C.–121° C. at a line speed of 400 feet per minute. This coating operation was repeated on the opposite side of the scrim film.

The scrim film was then laminated to the PEAA film prepared according to P1 by heating the PEAA to 121° C. and laminating it to the scrim film at 40 psi. The operation was repeated on the opposite side of the construction to complete the three layer laminate illustrated in FIG. 1. Delamination of the scrim film from the PEAA film occurs at 7 pounds per inch of force. The total thickness of the this construction was between 15–16 mils (0.38 mm–0.41 mm). The laminate did not crease or "black line" after crimping and was very flexible.

The laminate was also subjected to the following laminate construction tests:

(1) Creep Test - Dimensional Stability

A 2 kilogram (Kg) weight was attached to the end of a 7.6 cm long sample of the laminate. The sample was 1.75 cm wide. The weight was allowed to hang from the construction for thirteen (13) hours at a temperature of approximately 65° C. This test was run on samples there were cut in both the downweb (MD) and crossweb (TD) direction. The laminate was then measured to determine how much creep had occurred. After 13 hours, no measurable creep occurred in either the downweb or crossweb directions.

A similarly sized sample of PEAA only, that is, without the scrim film layer, was tested. Without the scrim film layer, the PEAA film stretched 500% before breaking.

(2) Optical Testing

The laminate was tested using a MacBeth Model TR 927 Densitometer and was optically translucent with a light transmission (% T) of 27%.

(3) Tensile and Tear Strength

The tensile strength of the laminate was determined according to ASTM Test Method D 3759-83 using a 4 inch (10.2 cm) gauge length and a separation rate of 2 in/min. The measurements were taken on an Instron Model 1000, using a notched sample 1.5 inches wide and 4.375 inches long. The results are reported in lbs./in.

The Graves tear strength of the laminate was determined according to ASTM D 1004-89 (modified). The measurements were taken on an Instron Model 1000, using a notched sample 1.5 inches wide and 4.375 inches long. The results are reported in lbs./in.

Example 2

This sign face substrate was a multilayer scrim film prepared according to Example P2 and laminated between two layers of pigmented PEAA (ethylene acrylic acid) prepared according to Example P1. The three layers of film (a layer of pigmented PEAA, a layer of multilayer scrim film and a layer of pigmented PEAA) were laminated together using a one part polyether urethane adhesive (commercially available from Morton International under the trade name of "Adcote 76F593S"). The adhesive was prepared for coating by mixing a 50:50 by weight solution of the polyether urethane adhesive and methyl ethyl ketone. The adhesive was Gravure coated to both sides of the scrim film at 30% solids to give a dry coating weight of 1.5 lb/ream. The adhesive coated scrim film was then sandwiched between the two layers of pigmented PEAA and laminated at a temperature of 66° C. at a pressure of 40 psi. This laminate was cured for 7 days. Total thickness of the laminate was 15–16 mils (0.38–0.41 mm).

The ply adhesion strength between the PEAA and the adhesive coated scrim film of the laminate was 3.0 lb/in. The laminate was also tested for thermal creep, optical properties, and tensile and tear strength according to the testing procedures described in Example 1. The results are summarized in Table I. The laminate did not blackline after crimping and had the flexibility needed for mounting in a variety of sign systems.

Example 3

A sign face substrate was prepared using a layer of pigmented PEAA as described in Example P1 laminated to both sides of the scrim film described in Example P2. The pigmented PEAA was laminated to the scrim film using a process described in U.S. Pat. No. 3,188,265 and such description is incorporated herein by reference. According to this process, both sides of the scrim film were extrusion coated with a clear tie layer having a film thickness of 0.8 mil. The tie layer was PEAA (commercially available as "Primacor 3330"). Each interface of the scrim film to clear tie layer was irradiated through the clear tie layer using a Hanovea UA-15 lamp for 30 seconds operating at a wavelength of 256 nm. This gave an interfacial adhesion of 10 lb/in. The pigmented PEAA were then extruded onto the tie layer, thereby producing the final sign face substrate. The laminate was tested according to the procedures described in Example 1 and the results are summarized in Table I.

Example 4

A sign face substrate was prepared using a layer of pigmented PEAA as described in Example P1 laminated to both sides of the scrim film described in Example P3. The laminate was prepared according to the procedures described in Example 3. The laminate was tested according to the procedures described in Example 1 and the results are summarized in Table I.

Example 5

A sign face substrate was prepared using a layer of pigmented PEAA as described in Example P1 laminated to both sides of the scrim film described in Example P6. The laminate was prepared according to the procedures described in Example 1. The laminate was tested according to the procedures described in Example 1 and the results are summarized in Table I.

Example 6

A sign face substrate was prepared using a layer of pigmented PEAA as described in Example P1 laminated to both sides of the scrim film described in Example P6. The laminate was prepared according to the procedures described in Example 2. The laminate was tested according to the procedures described in Example 1 and the results are summarized in Table I.

Example 7

A sign face substrate was prepared using a layer of pigmented PEAA as described in Example P1 laminated to both sides of the scrim film described in Example P6. The laminate was prepared according to the procedures described in Example 3. The laminate was tested according to the procedures described in Example 1 and the results are summarized in Table I.

Example 8

A sign face substrate was prepared with three layers of film where each layer of film was different. The first layer (layer that graphic was applied to) was 6 mil pigmented PEAA prepared according to Example P1. The middle layer was the scrim film prepared according to Example P2. The third layer was a 6 mil (0.15 mm) stabilized HIFAX™ thermoplastic olefin (commercially available from Himont Corp.) and compounded with the same pigments as used in the first layer of the PEAA film. This sign face substrate was laminated according to the procedures described in Example 2. The laminate was tested according to the procedures described in Example 1 and the results are summarized in Table I.

Example 9

A sign face substrate was prepared with three layers of film where each layer of film was different. The first layer (layer that graphic was applied to) was 6 mil pigmented PEAA prepared according to Example P1. The middle layer was the scrim film prepared according to Example P3. The third layer was a 6 mil (0.15 mm) stabilized plasticized polyvinyl chloride (used in commercially available PANAFLEX™ sign face substrate available from 3M, Co.) and compounded with same pigments as used in the first layer of the PEAA film. This sign face substrate was laminated according to the procedures described in Example 2.

Example 10

A sign face substrate was prepared with three layers of film. A sign face substrate was prepared using vinyl film, pressure sensitive adhesive and a multilayer scrim film prepared according to Example P2.

The multilayer scrim film was laminated between two layers of vinyl film using a clear transfer acrylic-acid-acrylate adhesive having a dry coating thickness of 1 mil (25.4 μm) and then roll laminating at an air pressure of 40 psi. The two layers of vinyl film were a white diffusing film (commercially available from 3M, Co. under the trade name "Scotchcal VT-0870").

The sign face substrate was tested according to the procedures described in Example 1 and had a transmissive optical density in the range of 25–50%.

Example 11

A sign face substrate was prepared using vinyl film, pressure sensitive adhesive and three layers of a multilayer layered scrim film prepared according to Example P9.

Three layers of film were laminated together using clear transfer acrylic acid-acrylate adhesive (dry coating thickness of 1 mil (25.4 μm) and a roll laminator at an air pressure of 40 psi. Once the lamination of the three layer of scrim film was complete, this laminated construction (designated as "laminate 1") was laminated between two layers of vinyl film. The two layers of vinyl film were a white diffusing film (commercially available from 3M, Co. under the trade name "Scotchcat VT-0870"). The adhesive used to laminate the vinyl films to the scrim film was the same clear transfer acrylic acid-acrylate adhesive as above.

This new construction (designated "sign face substrate") had a composite thickness of 20 mils (0.51 mm) and had, in sequential order, 1 layer of vinyl film, 1 layer of adhesive, laminate 1 (1 layer of PET:EVA 9-layered film, 1 layer of adhesive, 1 layer of PET:EVA 9-layered film, 1 layer of adhesive, and 1 layer of PET:EVA 9-layered film), 1 layer of adhesive and 1 layer of vinyl film for a total of 33 layers. This sign face substrate had an appearance superior to commercial woven-cloth reinforced sign substrate and other scrim reinforced vinyl laminates. The laminate was tested according to the procedures described in Example 1 and the results are summarized in Table I.

Example 12

A sign face substrate was prepared using the laminate 1 described in Example 11.

A translucent vinyl film was made from a Geon 178 vinyl dispersion with heat stabilizers, permanent plasticizers and $BaSO_4$ and $TiO_2$ as pigments.

This film was cast on a paper release liner and cured to form a fused vinyl film. This film was then bonded to a layer of transfer adhesive. Laminate 1 was sandwiched between two layers of the translucent vinyl film and then bonded together.

Example 13

A sign face substrate was prepared according to Example 11 except a 13-layered scrim film prepared according to P10 was used in place of the 9-layered scrim film.

This new construction (designated "sign face substrate") had a composite thickness of 15 mils (0.38 mm) and had, in sequential order, 1 layer of vinyl film, 1 layer of adhesive, laminate 1 (1 layer of PET:EVA 13-layered film, 1 layer of adhesive, 1 layer of PET:EVA 13-layered film, 1 layer of adhesive, and 1 layer of PET:EVA 13-layered film), 1 layer of adhesive and 1 layer of vinyl film for a total of 45 layers.

The laminate was tested according to the procedures described in Example 1 and the results are summarized in Table I.

This sign face substrate has an appearance superior to commercial woven cloth reinforced sign substrates and other scrim reinforced vinyl laminates. The visual appearance was considered superior because there were no shadows formed by the scrim fibers.

TABLE I

| Ex. | Creep Test | Optical (% T) | Tensile Strength‡ (lb/in) | | Graves Tear‡ (lb/in) | | Interfacial Adhesion* (lb/in) |
| --- | --- | --- | --- | --- | --- | --- | --- |
| | | | MD | TD | MD | TD | |
| 1 | N | 27 | 82 | 97 | 32 | 40 | — |
| 2 | N | 28.8 | 80.9 | 96.6 | 31.1 | 40.1 | — |
| 3 | N | 29.5 | 83.4 | 97.5 | 33.2 | 41.2 | — |
| 4 | N | 30 | 85.0 | 98.1 | 35.4 | 40.6 | 10.9 |
| 5 | N | — | 82.0 | 97.8 | 33.0 | 40.1 | 6.2 |
| 6 | N | 27.1 | 80.8 | 95.1 | 35.4 | 39.9 | 3.0 |
| 7 | N | 29 | 81.6 | 98.9 | 36.0 | 42.1 | 9.0 |
| 8 | N | 24.5 | 81.8 | 98.2 | 33.6 | 42.1 | 3.0/1.4† |
| 11 | — | 35 | 109.8 | 101.9 | 85.7 | 61.3 | — |
| 13 | — | — | 93.0 | 94.3 | 72.5 | 69.0 | — |

‡measured on an Instron Model 1000
*durable thermoplastic sheeting-scrim film interface
†PEAA-Scrim Film Interface/HIFAX-Scrim Film Interface Other configurations can be made using greater or fewer layers of multilayer scrim film laminates, or multilayer films which are thicker or thinner. The choice of scrim films and durable thermoplastics will depend upon the final physical properties of the sign face substrate desired.

Examples 14–15

These examples describe two non-limiting methods for installing the sign face substrate of the present invention. The method utilizes the propensity of the sign face substrate comprised of an oriented polyester scrim film to shrink at elevated temperatures. Such shrinkage provides an advantageous means of tensioning the sign face substrate within a sign frame. Tensioning removes wrinkles from the sign face substrate as well as obtains a firmly stretched installation of the substrate.

Example 14

A sign face substrate containing a thirteen layered scrim film, comprised of PET and sebacic acid copolyester (Example P2) was cut into a one inch wide by ten inch long strip and fastened into the jaws of an Instron (Model #1122) tensile test machine. Upon heating to 100° C. and cooling, the tensile load developed due to shrinkage was 2.3 lb., which is sufficient to provide a usable tension of the substrate in a sign frame. For example, the sign face substrate can be mechanically held in place while the sign face substrate is placed under tension. The process of installation is completed by applying heat to the sign face substrate, for example, using a stream of heated air (such as available from a heat gun) or by placing the sign frame containing the sign face substrate in an oven.

Example 15

Alternatively, it would be advantageous to attach the sign face substrate to a frame by using an adhesive and then optionally heat shrinking. A one inch by 10 inch strip of film (same as described in Example 14) with approximately 10 mils of PEAA laminated to one side and 10 mils of vinyl laminated to the other side was adhered by the PEAA face to a sheet of chromated aluminum using an epoxy adhesive (commercially available from 3M Co., under the trade designation "DP-190"). The epoxy adhesive was cured for 30 minutes at 81° C.

The lap shear strength of this joint was tested in the Instron tensile test machine (Model #1122) and was found to be 35 lbs on the lap joint of one square inch area. Failure was due to tensile elongation and breakage of the sign material rather than failure of the adhesive joint. A second lap joint was prepared and cured for 3 hours at 40° C. A 180 degree peel test was performed and an average peel strength of 2.2 lb/in was measured.

For both the lap shear and peel test, the aluminum was mounted in one jaw and the sign face substrate was mounted in the other jaw without slack. The jaws were moved apart as a rate of 0.2"/min until the sign face substrate lap joint failed or the sign face substrate was peeled away from the aluminum. Such lap shear and peel strength are suitable for adhering the sign face substrate of the present invention to an art known aluminum sign face frame.

Various modifications and alterations of this invention will become apparent to those skilled in the art without departing from the scope and spirit of this invention, and it should be understood that this invention is not to be unduly limited to the illustrative embodiments set forth hereinabove.

I claim:

1. An optically uniform sign face substrate comprising sequential order:

(a) a first layer of durable thermoplastic sheeting;

(b) a multilayer scrim film; and (c) a second layer of durable thermoplastic sheeting, wherein the optically uniform sign face substrate is clear, transparent or translucent and does not show a visible pattern when backlit and the first and second layer of durable thermoplastic sheeting comprises one or more layers of polyester, polyamide, polyimide, plasticized or non-plasticized polyvinyl chloride, polyethylene acrylic acid, polyurea, polyurethane, polypropylene, polyethylene methacrylic acid, thermoplastic rubber, polypropylene oxide, polystyrene, polystyrene-polydiene block copolymer, ionic thermoplastic elastomer, polyether, polyesteramide, polyetheresteramide, siloxane, ethylene vinyl acetate, polymethacrylic acid, acetate copolymer, PVDC, polycaprolactone, silicone rubber, fluorine-containing elastomers, polybutene, elastomeric block copolymers and blends and mixtures thereof.

2. The optically uniform sign face substrate according to claim 1, wherein the first and second layers of durable thermoplastic sheeting are the same chemical composition.

3. The optically uniform sign face substrate according to claim 1, wherein the first and second layers of durable thermoplastic sheeting are prepared from polyethylene acrylic acid.

4. The optically uniform sign face substrate according to claim 1, wherein the first and second layers of durable thermoplastic sheeting are prepared from polyvinyl chloride.

5. The optically uniform sign face substrate according to claim 1, wherein the first layer of durable thermoplastic sheeting is prepared from polyethylene acrylic acid and the second layer of durable thermoplastic sheeting is prepared from polyvinyl chloride.

6. The optically uniform sign face substrate according to claim 1, wherein the multilayer scrim film comprises alternating layers of a stiff polyester or copolyester and a durable polymeric material.

7. The optically uniform sign face substrate according to claim 6, wherein the mutilayered scrim film have 5 to 35 layers.

* * * * *